United States Patent [19]

Steinleitner

[11] Patent Number: 4,515,874
[45] Date of Patent: May 7, 1985

[54] ELECTROCHEMICAL STORAGE CELL

[75] Inventor: Günther Steinleitner, Schriesheim, Fed. Rep. of Germany

[73] Assignee: Brown, Boveri & Cie Ag, Mannheim, Fed. Rep. of Germany

[21] Appl. No.: 368,645

[22] Filed: Apr. 15, 1982

[30] Foreign Application Priority Data

May 2, 1981 [DE]  Fed. Rep. of Germany ....... 3117382

[51] Int. Cl.$^3$ ............................................. H01M 4/36
[52] U.S. Cl. .................................... 429/104; 429/193
[58] Field of Search ............... 429/101, 104, 102, 103, 429/194, 193

[56] References Cited

U.S. PATENT DOCUMENTS 4,220,691  9/1980  Roth et al. .......................... 429/104
4,225,395  9/1980  Tsang ................................. 204/1 A
4,356,241  10/1982 Wright et al. ....................... 429/193

OTHER PUBLICATIONS

*General Chemistry: A Systematic Approach* Sisler, Vander Werf, and Davidson; 1949, p. 706.

Primary Examiner—Charles F. LeFevour
Attorney, Agent, or Firm—Herbert L. Lerner; Laurence A. Greenberg

[57] ABSTRACT

Electrochemical storage cell of the alkali metal and chalcogen type with at least one anode space for the alkali metal anolyte, and a cathode space for the chalcogen catholyte, with the anode space and the cathode space separated from each other by an alkali ion-conducting solid electrolyte wall, the improvement comprising the addition in the anode space of sodium and of a capturing material with $O_2$-getter properties in an amount sufficient to absorb detrimental bound or free oxygen.

6 Claims, 1 Drawing Figure

U.S. Patent   May 7, 1985   4,515,874
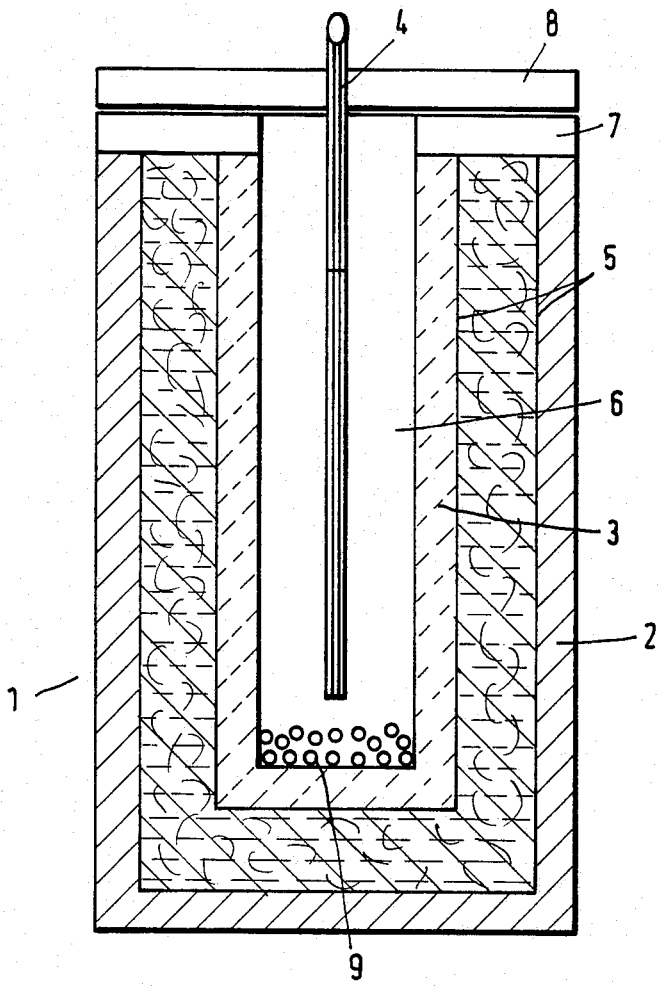

ELECTROCHEMICAL STORAGE CELL

BACKGROUND OF THE INVENTION

1. Field of the Invention

The invention relates to an electrochemical storage cell or battery of the alkali metal and chalcogen type with at least one anode space for receiving the anolyte, and a cathode space for receiving the catholyte, which are separated from each other by an alkali ion-conducting solid electrolyte wall.

2. Description of the Prior Art

Such rechargeable electrochemical storage cells with a solid electrolyte are highly suitable for constructing storage batteries with higher energy and power density. The solid electrolyte or $\beta$-aluminum oxide used, for instance, in sodium-sulfur storage cells, allows only sodium ions to pass. This means that, contrary to lead storage cells, practically no self-discharge takes place and no secondary reactions occur during the discharge such as, for instance, water dissociation in the case of lead/lead oxide systems. The current yield, i.e. the Faraday efficiency of a sodium/sulfur storage cell is close to 100%.

In these storage cells it is an important disadvantage that the alkali metal can be filled into the anode space of the storage cells only at considerable technical costs. Filling-in the alkali metal raises problems particularly for the reason that the alkali metal, preferably sodium, is filled into the anode space of the storage cells. The sodium must be filled into the anode space in a vacuum or in a protective gas. The filled anode space must, likewise, be sealed off under vacuum conditions or in a protective gas. Sodium, as is well known, is a strongly electronegative metal which has a very large capacity for reduction so that it is heavily oxidized by the air oxygen, especially by moist air. Oxygen must not be present in any case within the cell because the electrical behavior is degraded thereby. This causes in particular an increase of the resistance through the formation of a high-resistance $Na_2O$-layer on the solid electrolyte. Furthermore, the corrosive action of the oxygen-containing sodium on metallic cell components, in particular on the seal and on the connecting glass between the $\alpha$ and $\beta$-aluminum oxide is increased by oxygen present within the cell. Such bound oxygen in the moisture and in $Na_2O$ and free oxygen in the anode space have, as explained above, a detrimental effect and are designated detrimental bound or free oxygen.

SUMMARY OF THE INVENTION

It is therefore an object of the invention to provide a storage cell of the alkali metal and chalcogen type in which detrimental bound or free oxygen in the anode space is avoided.

With the foregoing and other objects in view, there is provided in accordance with the invention an electrochemical storage cell of the alkali metal and chalcogen type with at least one anode space for the alkali metal anolyte, and a cathode space for the chalcogen catholyte, with the anode space and the cathode space separated from each other by an alkali ion-conducting solid electrolyte wall, the improvement comprising the addition in the anode space of sodium and of a capturing material with $O_2$-getter properties in an amount sufficient to absorb detrimental bound or free oxygen.

Other features which are considered as characteristic for the invention are set forth in the appended claims.

Although the invention is illustrated and described herein as embodied in an electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawing which diagrammatically illustrates the electrochemical storage cell of the invention, in which a cup-shaped solid electrolyte is disposed in a cup-shaped metal container with the anode interior space of the electrolyte containing sodium, zirconium as the capturing substance for $O_2$, and a current collector extending into the anode space, and the cathode space between the electrolyte and the metal container is filled with graphite felt saturated with sulfur, and the cell is sealed by an $\alpha$ aluminum oxide flange on which is disposed a cover plate.

DETAILED DESCRIPTION OF THE INVENTION

In the storage cell of the type mentioned at the outset, sodium and a predeterminable amount of a capturing substance with $O_2$-getter properties is filled into the anode space. The amount of the capturing substance filled into the anode space amounts to only a few grams. The sodium and the capturing substance are filled into the anode space one after the other and separated from each other. The capturing substance can be embedded in the metal felt which is arranged at the side of the anode space. If the capturing substance is placed loosely into the anode space, it can be filled into the space before or after the sodium. A metal of the second or third main group of the periodic system of elements can be used as a capturing substance. Likewise, a transition metal, a lanthanide metal or an actinide metal may be used.

A metal alloy which contains metals of the second and third main group of the periodic system, transition metals, lanthanide metals and actinide metals is likewise suitable as a capturing substance. A metal alloy which contains any metal desired and at least one metal of the second or third main group of the periodic system, respectively, a transition metal, a lanthanide metal and/or an actinide metal can likewise be filled into the anode space of the storage cell as getter material. A chemical compound which contains a getter metal and which can be decomposed for releasing the getter metal at a temperature between the rest temperature of the storage cell and 500° C., preferably between 250°–450° C., can, likewise, be used for removing oxygen components in the anode space. Particularly high effectiveness of the capturing material is provided if it has a large surface, i.e. is arranged in the anode space in finely distributed form. The capturing substance or the getter material is preferably arranged within the anode space as a metal sponge, in the form of chips, as metal granules or powder or as a metal felt. The capturing substance can also be applied as a coating to the metal felt arranged in the anode space. The capturing substance may be applied as a coating to the inside surfaces of the anode space. If the capturing material is placed in the anode space in the form of a powder or granulate, it can be admixed to the capillary-active powder which is, likewise, to be filled into the anode space. The capturing material can also be applied as a coating on a ceramic or glass powder which is subsequently filled into the anode space. The effectiveness of the capturing substance, particularly its ability to absorb oxygen is so high that small amounts are adequate to keep the alkali metal electrode free of oxygen. The mass ratio between the capturing substance and the sodium is preferably chosen as 1:10 to 1:100.

A further advantage of the invention is seen in the fact that the expense as to equipment and time mentioned at the outset in the case of the conventional filling of the storage cells with sodium is now eliminated, since the sodium can be filled into the storage cell in air or only under a protective glass bell in the case of the storage cell described here. While oxygen from the air in the form of superficially developed sodium oxide also gets into the anode space of the storage space, this oxygen is chemically bound by the capturing substance, particularly the getter material, which is found in the anode space of the storage cell according to the invention. The binding of the oxygen contained in the anode space to the capturing substance is based on the fact that the formation enthalpies ($\Delta G$ values) of the oxides of the capturing material are of higher magnitude than the formation enthalpy of $Na_2O$. It is $-67.0$ kJ/mol.

A further great advantage of the storage cell according to the invention, particularly of the capturing substance filled into the anode space, involves the requirements as to the sealing of the closure of the sodium/sulfur storage cell, which requirements can be definitely relaxed since the oxygen which is diffused into the anode space in time due to leaks of the storage cell, is absorbed by the capturing substance. In the storage cell according to the invention, advantageously, the anode space can be sealed off in air. This makes possible the use of very simple fast and time-saving welding processes such as, for instance, the WIG or MIG welding process.

Heretofore, an elaborate vacuum welding process, such as the electron-beam welding process had to be used for the sealing. A further advantage of the use of the capturing substance in accordance with the invention results from the fact that water which is dragged in, for instance, with the hygroscopic solid electrolyte ceramic, is made harmless in its effect on the storage cell.

The water which was introduced into the storage cell in the manner described above is first dissociated by the sodium, forming hydrogen and sodium oxide. By the capturing material present in the anode space, the oxygen is dissociated again from the sodium and forms, together with a metallic capturing substance, a metal oxide so that sodium is produced again. The dissociation of the water dragged into the storage cell, using zirconium as the capturing material will be described with the aid of the following chemical equations:

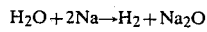

$H_2O + 2Na \rightarrow H_2 + Na_2O$

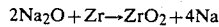

$2Na_2O + Zr \rightarrow ZrO_2 + 4Na$

The storage cell according to the invention will be explained in the following.

Referring to the drawing, the storage cell 1 according to the invention, has a cup-shaped body 2 of metal, a solid electrolyte 3 and a current collector 4. The cup-shaped body 2 of metal is a tube closed off on one side, which may be made, for instance, of thin-walled aluminum. A likewise cup-shaped solid electrolyte 3 is disposed in the interior of the cup-shaped body 2. This is a tube of $\beta$-aluminum closed off on one side. The dimensions of the solid electrolyte 3 are chosen so that a minimum distance of several mm is provided everywhere between its outer boundary surfaces and the inner boundary surfaces of the metal body 2. Thereby, a coherent space 5 is provided in between, which serves as the cathode space. In the example described here, the latter is filled with a graphite felt which is saturated with sulfur. The metal body 2 also serves as the cathodic current collector. The interior of the solid electrolyte 3 forms the anode space 6 into which the alkali metal, particularly the sodium, is filled. The amount of the sodium filled into the solid electorlyte 3 is chosen so that at least in the charged condition of the storage cell, the lateral boundary surfaces of the solid electrolyte are completely wetted by the sodium. The cup-shaped solid electrolyte 3 has at its open end a flange 7 of $\alpha$-aluminum oxide which is connected, for instance, via glass solder, to the solid electrolyte 3. The flange is seated on the upper rim of the metal housing, so that the cathode space 5 which is located between the inner surface of the metal housing and the solid electrolyte, is sealed off by the flange 7. A cover plate 8 placed on the flange 7 seals the storage 1 from the outside. The closure described here is shown only schematically; various details are not here described because they are not necessary for an understanding of the invention.

The metallic current collector 4 which goes through the cover plate 8 and extends upwardly slightly above the plate 8, also protrudes downward into the anode space 6. In the storage cell described here, not only is the sodium enclosed in the anode space but also, according to the invention, a capturing substance 9, which has $O_2$ getter properties. In the embodiment example described here, zirconium crystals are filled into the anode space as the capturing substance. The remaining areas of the anode space 6 are filled with sodium.

The storage cell shown here is about 25 cm high and has an outside diameter of approximately 4 cm. The solid electrolyte has a somewhat smaller height. Its inside diameter is about 2 cm. The volume of its interior is about 70 cm$^3$. To absorb the oxygen which can accumulate within the anode space 6, be it because it is introduced together with the sodium in the form of sodium oxide or diffuses in the course of the cell operation through the closure, only a small amount, in particular a few grams of zirconium 9 are required.

By adding this capturing substance into the anode space 6, the sodium can be loaded into the anode space 6 with a simplified filling technique during the manufacture of the storage cell. In particular, the sodium can be filled-in in air or under a protective glass bell. Conventional welding techniques can be utilized for the sealing.

Other capturing materials can be used instead of the zirconium 9 which is placed in this embodiment example in the anode space 6. In particular, metals of the second and third main group of the periodic system are suitable. Particularly well suited for this purpose are beryllium, magnesium, calcium, strontium, barium, radium or aluminum and boron. The transition metals such as vanadium, niobium, tantalum, titanium and hafnium can also be employed as capturing substances.

Lanthanide metals such as lanthanum, cerium, neodymium, praseodymium, samarium, europium, gadolinium, terbium, dysprosium, holmium, erbium, thulium, ytterbium lutetium can likewise be used. Actinide metals such as thorium, protactinium and uranium are likewise suitable as the capturing substance.

Metal alloys which contain metals of the second or third main group of the periodic system of the elements, transition metals, lanthanide metals and actinide metals can be used as capturing substances.

The capturing substance filled into the anode space 6 may also be an alloy which contains at least one metal as desired and at least one metal of the second or the third main group of the periodic system, a transition metal, a lanthanide metal and/or an actinide metal. An optimum effect of the capturing substance is obtained if it is arranged with a surface in the anode space 6 as large as possible. The capturing substance is preferably placed in the anode space 6 in the form of crystals. The effectiveness of the capturing substance in the form of metal grit is likewise very good. Capturing substances in the form of a metal sponge or felt can also be used. Metal foils permit easy handling and can be inserted into very small anode spaces. The capturing substance may also be applied as a coating on the metal felt arranged in the anode space 6. In order that the surface area of the capturing substance may be enlarged, it can also be applied as a coating on a glass or ceramic powder which is filled subsequently into the anode space 6.

The invention is not limited to the embodiment example just described and the capturing substances mentioned in the description; the invention rather covers all getter materials which absorb oxygen.

We claim:

1. In an electrochemical storage cell of the alkali metal and chalcogen type with at least one anode space for the alkali metal anolyte, and a cathode space for the chalcogen catholyte, with the anode space and the cathode space separated from each other by an alkali ion-conducting solid electrolyte wall, the improvement comprising the addition in the anode space of sodium and of a capturing material with $O_2$-getter properties in an amount sufficient to absorb oxygen bound to water which is dragged in the cell with the hygroscopic solid electrolyte or oxygen which is diffused into the anodic space, wherein the capturing substance is a metal selected from the group consisting of metals of the third main group of the periodic system of the elements, and the amount of capturing agent relative to the sodium is a mass ratio between 1:10 and 1:100.

2. In an electrochemical storage cell of the alkali metal and chalcogen type with at least one anode space for the alkali metal analyte, and a cathode space for the chalcogen catholyte, with the anode space and the cathode space separated from each other by an alkali ion-conducting solid electrolyte wall, the improvement comprising the addition in the anode space of sodium and of a capturing material with $O_2$-getter properties in an amount sufficient to absorb oxygen bound to water which is dragged in the cell with the hygroscopic solid electrolyte or oxygen which is diffused into the anodic space, wherein the capturing substance is a metal selected from the group consisting of vanadium, niobium, tantalum, titanium and hafnium, and the amount of capturing agent relative to the sodium is a mass ratio between 1:10 and 1:100.

3. In an electrochemical storage cell of the alkali metal and chalcogen type with at least one anode space for the alkali metal anolyte, and a cathode space for the chalcogen catholyte, with the anode space and the cathode space separated from each other by an alkali ion-conducting solid electrolyte wall, the improvement comprising the addition in the anode space of sodium and of a capturing material with $O_2$-getter properties in an amount sufficient to absorb oxygen bound to water which is dragged in the cell with the hygroscopic solid elctrolyte or oxygen which is diffused into the anodic space, wherein the capturing substance is a metal selected from the group consisting of thorium, protactinium and uranium, and the amount of capturng agent relative to the sodium is a mass ratio between 1:10 and 1:100.

4. In an electrochemical storage cell of the alkali metal and chalcogen type with at least one anode space for the alkali metal anolyte, and a cathode space for the chalcogen catholyte, with the anode space and the cathode space separated from each other by an alkali ion-conducting solid electrolyte wall, the improvement comprising the addition in the anode space of sodium and of a capturing material with $O_2$-getter properties in an amount sufficient to absorb oxygen bound to water which is dragged in the cell with the hygroscopic solid electolyte or oxygen which is diffused into the anodic space, wherein the capturing substance is a metal alloy which contains metals selected from the group consisting of the second and third main groups of the periodic system of elements, transition metals, lanthanide metals and actinide metals, and the amount of capturing agent relative to the sodium is a mass ratio between 1:10 and 1:100.

5. In an electrochemical storage cell of the alkali metal and chalcogen type with at least one anode space for the alkali metal anolyte, and a cathode space for the chalcogen catholyte, with the anode space and the cathode space separated from each other by an alkali ion-conducting solid electrolyte wall, the improvement comprising the addition in the anode space of sodium and of a capturing material with $O_2$-getter properties in an amount sufficient to absorb oxygen bound to water which is dragged in the cell with the hygroscopic solid electrolyte or oxygen which is diffused into the anodic space, wherein the capturing substance is an alloy which contains at least one metal selected from the group consisting of the second or third main groups of the periodic system of the elements, a transition metal, a lanthanide metal and an actinide metal and which also contains at least one metal other than said selected metal, and the amount of capturing agent relative to the sodium is a mass ratio between 1:10 and 1:100.

6. In an electrochemical storage cell of the alkali metal and chalcogen type with at least one anode space for the alkali metal anolyte, and a cathode space for the chalcogen catholyte, with the anode space and the cathode space separated from each other by an alkali ion-conducting solid electrolyte wall, the improvement comprising the addition in the anode space of sodium and of a capturing material with $O_2$-getter properties in an amount sufficient to absorb oxygen bound to water which is dragged in the cell with the hygroscopic solid electrolyte or oxygen which is diffused into the anodic space, wherein the capturing substance is an alloy which contains at least one metal selected from the group consisting of the second or third main groups of the periodic system of the elements, a transition metal, a lanthanide metal and an actinide metal and which also contains at least one metal other than said selected metal, and the capturing substance is applied as a coating on glass or ceramic powder which is added into the anode space.

* * * * *